July 27, 1926.
C. BITTINGER
RAIL
Filed March 13, 1926
1,593,895
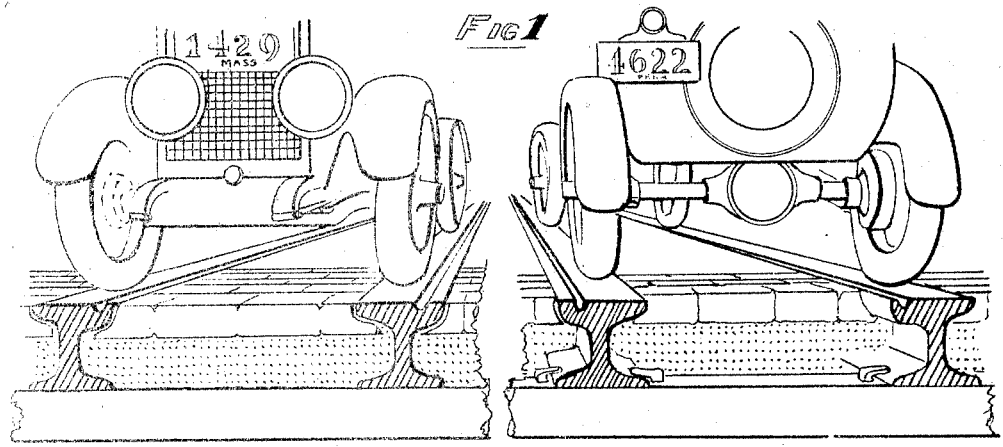
FIG 1
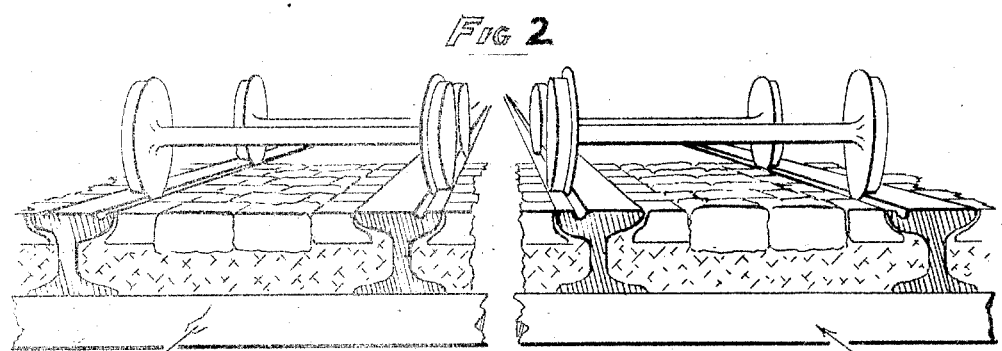
FIG 2
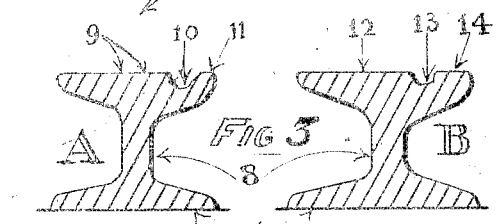
FIG 3
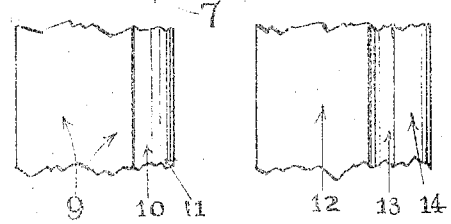
Inventor
Charles Bittinger
By Frank H. Borden
Attorney Patented July 27, 1926.

1,593,895

UNITED STATES PATENT OFFICE.

CHARLES BITTINGER, OF BROOKLINE, MASSACHUSETTS.

RAIL.

Application filed March 13, 1926. Serial No. 94,497.

My invention relates to rails, pertaining particularly to rails adapted for use by every sort of vehicular traffic.

Rails as installed in the manner followed in most urban communities, are shouldered or flanged to receive the flanges of wheels, and with their upper or traction surfaces in the plane of the road in which they are embedded. The conventional rail is arranged to receive only the flanged metallic wheels of trolley cars, trains and similar rolling stock of our transportation systems, to the normal exclusion of motor vehicles, such as automobiles, motor trucks, motor buses, etc. Not only because of differences in gauge between the rails and the wheels of the motor vehicles, but also, and of great moment, because of the rapid deterioration of the resilient tires of the motor vehicles incident to their contact with the sharp and angular portions of the rails. It has heretofore been impossible for motor vehicles to traverse such rails without such disadvantageous cutting of the tires, because of the relative narrowness of the rails, among other reasons.

The tremendous growth of vehicular traffic incident to motorized transportation has failed to develop a paving material that will "stand up" under the great wear and pounding strain to which the modern road is subjected, despite the vast sums spent in laying and maintaining the roadways. The only material that will not show destructive wear in a short time is steel, and obviously it would be impracticable to provide a steel roadway, as the cost alone would be prohibitive.

Some of the objects of this invention are; to provide rails having bearing portions for any sort of vehicular traffic; to provide rails having a flange receiving groove at one side of a wide tread or traction surface; to provide a pair of rails having each a groove to receive the flanges of flanged wheels and having a motor vehicle tread receiving surface laterally of the groove in each rail to offset the center line of such motor vehicles from the center line of the flanged wheels; to provide rails with tread or traction surfaces so arranged as to afford clearance for a wide motor vehicle from a motor vehicle on an adjacent pair of rails; to provide rails having grooves and tread surfaces so arranged that the clearance afforded between motor vehicles on adjacent pairs of rails is at least as great as the clearance afforded between the side edges of vehicles supported on flanged wheels received in the grooves; and many other objects.

In carrying out my invention I provide in a preferred form, a pair of rails, each rail having a relatively wide upper surface, said surfaces being in a plane substantially, and each provided toward one edge with a longitudinal groove, and so arranged that a wide traction surface is available for motor vehicles, and to one side of such surfaces the flanged portions of metallic wheels are receivable in the grooves.

In the accompanying drawings:

Fig. 1, is a vertical section through two pairs of rails and the adjacent roadway, showing a motor vehicle on each pair of rails on the tread surfaces thereof, showing the disposition of the resilient tires of the vehicles relative the grooves for the flanged wheels and also indicating the clearance afforded between adjacent vehicles.

Fig. 2, is a similar view, but showing the rails as receiving the flanged wheels of trolley cars or similar rolling stock, and Fig. 3, is an enlarged section and top plan view broken away, of the left hand pair of rails in the other two figures.

Referring now to Fig. 3, each rail has a base 7, and a vertical fin 8. In rail A the upper plane surface 9 accommodates or supports both the resilient tires of motor vehicles and the metallic tires of the wheels of trolley cars, etc. The groove 10 accommodates the flanges of such trolley car wheels which are guided thereby, although the metallic tire is supported on the edge of surface 9 adjacent the groove 10. In rail A, the groove is on the right hand side of the plane 9, and has the usual guard 11, arranged in the plane of surface 9.

The rail B is arranged somewhat differently. The wide upper plane tread surface 12, for the resilient tires of the motor-vehicles is on the left hand side of the flange groove 13. To the right of flange groove 13, the upper plane surface 14 is provided in the plane of the tread surface to receive and support the metallic wheels of trolley cars.

The rails as indicated in Figure 3, and the left hand side of Figures 1 and 2, are for traffic coming toward the reader. For traffic going away from the reader as shown in right hand side of Figures 1 and 2, the relative positions of rails A and B are changed so that rail B is at the left and rail A at the right, and upper surface 14 is at the extreme left and surface 9 at the extreme right, as will be clear. The exact position of the vertical fin 8 in relation to the base and the comparative relations of the areas on the upper surface may be modified by such considerations as the character of the traffic which the rail will be expected to support, and the maximum rigidity for a given weight of steel.

Considering a pair of rails, as for instance A and B in Figure 3, the rails are laid parallel, but each with the wide overhanging upper tread portions 9 and 12 disposed on the left side of the vertical fin 8. Similarly the groove or depression 10 and 13 of each rail is formed on the right side of the upper tread portion. It will be seen that the flange of a metallic wheel is received in each groove, with the longitudinal axis of the trolley car equidistant from each groove, although not equidistant relative the upper plane surfaces of the rails.

Thus trolley cars may travel on each pair of adjacent pairs of rails, and ample clearance is provided between them for safety. When trucks or buses travel on the upper plane tread surfaces of the rails, the centers thereof, longitudinally may be appreciably to the right of the center line of a trolley car as positioned on the same rails, and still the resilient tires will have ample traction on the tread surface of the rails and without contacting with the angular portions of the rails adjacent the grooves. This lateral displacement afforded by the rails enables two large trucks on opposed or adjacent tracks or rails to pass with perfect freedom and without striking.

Obviously the spaces between the rails may be, and should be filled with a desired medium substantially in the plane of the tread surfaces, upon which as desired operators of motor vehicles may swing out from the tracks for passing a slower vehicle in the front, when it may again return to the tracks or rails. In this connection an item of expense that has heretofore been of considerable import is practically elminated by this invention. This is the deterioration of the roadbed usually for perhaps a foot on each side of the rails, incident to the pounding strain to which it is subjected when motor vehicles are half on and half off the rails, and the half off is carried by the adjacent paving. This condition maintains more often perhaps in winter, but is a great problem. With the present invention this disintegration of the paving adjacent the rails is largely reduced as the rails are wide enough to receive and support the entire weight of the motor vehicles.

It will be noted that my improved unitary rail is such as can be formed by a single rolling in the mill, is strong enough for any use to which it may be put, and has a tread portion of great smoothness over any portion of which resilient tires may run with a minimum of wear, and yet which also guides and holds the flanged wheels of trolley cars.

I claim as my invention:

1. The combination of two rails arranged in parallelism, the entire upper surface of each rail being substantially plane and in the plane of the other substantially except for a longitudinal groove formed in each, the plane area of each rail forming a motor vehicle tread receiving surface on the same side respectively of said groove, the tread of one rail also being arranged to support a flanged wheel the flange of which is guided in the groove, and a shoulder in the plane of the tread receiving surface of the other rail but on the opposite side of the groove from said tread to support another flanged wheel the flange of which is guided in the groove of said other rail.

2. The combination of two rails, each of said rails having an upper tread portion substantially in the same plane, and each having a longitudinal groove in the tread portion at the same side respectively of the centers of said tread portions, and so arranged that the longitudinal axis or center line of trolley cars or trains guided by the grooves is spaced laterally an appreciable distance from the longitudinal axis of motor vehicles supported on said tread portions.

3. The combination with two pairs of rails, each rail of a pair having an upper tread portion and a longitudinal groove arranged toward the same side respectively of each rail, each pair being reversely disposed relative the other, and the whole so arranged that trolleys or trains passing over said rails are given a predetermined clearance between the pairs of rails, and further so that motor vehicles passing over said rails are accorded substantially the same clearance even though wider than said trolley or train.

In testimony whereof I affix my signature.

CHARLES BITTINGER.